US009465997B2

(12) United States Patent
Tu et al.

(10) Patent No.: US 9,465,997 B2
(45) Date of Patent: Oct. 11, 2016

(54) SYSTEM AND METHOD FOR DETECTION AND TRACKING OF MOVING OBJECTS

(71) Applicant: General Electric Company, Schenectady, NY (US)

(72) Inventors: Jilin Tu, Schenectady, NY (US); Yi Xu, Niskayuna, NY (US); Ana Isabel Del Amo, NE Ada, MI (US); Thomas Baby Sebastian, Chatham, NJ (US)

(73) Assignee: General Electric Company, Niskayuna, NY (US)

( * ) Notice: Subject to any disclaimer, the term of this patent is extended or adjusted under 35 U.S.C. 154(b) by 392 days.

(21) Appl. No.: 13/627,629

(22) Filed: Sep. 26, 2012

(65) Prior Publication Data
US 2014/0085545 A1 Mar. 27, 2014

(51) Int. Cl.
*G06K 9/00* (2006.01)
*G06K 9/62* (2006.01)
*G06T 7/20* (2006.01)

(52) U.S. Cl.
CPC ....... *G06K 9/00771* (2013.01); *G06K 9/00342* (2013.01); *G06K 9/6292* (2013.01);
(Continued)

(58) Field of Classification Search
CPC .......... H04N 7/18; H04N 5/77; H04N 7/183; H04N 5/14; H04N 7/188; H04N 7/185; G08B 13/19636; G08B 13/19656; G08B 13/19663; G08B 13/194; G08B 13/196; G06K 9/40; G06K 9/00; G06K 9/34; G06K 9/00778; G06T 7/20; G06T 7/2006
USPC ........................................................ 348/144
See application file for complete search history.

(56) References Cited

U.S. PATENT DOCUMENTS 5,809,161 A  9/1998  Auty et al.
6,061,088 A *  5/2000  Khosravi et al. ............. 348/169
(Continued)

FOREIGN PATENT DOCUMENTS

WO   9417636 A1   8/1994

OTHER PUBLICATIONS

Stern et al. A Prototype Fuzzy System for Surveillance Picture Understanding, IASTED International ConferenceVisualization, Imaging, and Image Processing (VIIP 2001), Marbella, Spain, Sep. 3-5, 2001.*

(Continued)

*Primary Examiner* — Jay Patel
*Assistant Examiner* — Frank Huang
(74) *Attorney, Agent, or Firm* — Paul J. DiConza

(57) ABSTRACT

A method implemented using a processor based device is disclosed. The method includes receiving a video stream comprising a plurality of image frames having at least one moving object, determining a difference between at least two image frames among the plurality of image frames and generating a difference image comprising a plurality of image blobs corresponding to the at least one moving object. The method further includes generating a plurality of bounding boxes, each bounding box surrounding at least one corresponding image blob among the plurality of image blobs, and determining a subset of bounding boxes among the plurality of bounding boxes, associated with the corresponding moving object, using a fuzzy technique based on a perceptual characterization of the subset of bounding boxes. The method also includes merging the subset of bounding boxes to generate a merged bounding box enclosing the subset of bounding boxes to detect the moving object.

15 Claims, 9 Drawing Sheets

(52) U.S. Cl.
CPC ... *G06T7/2053* (2013.01); *G06T 2207/10016* (2013.01); *G06T 2207/20141* (2013.01); *G06T 2207/30236* (2013.01)

(56) References Cited

U.S. PATENT DOCUMENTS

| | | | |
|---|---|---|---|
| 6,570,608 B1* | 5/2003 | Tserng | 348/143 |
| 6,633,232 B2* | 10/2003 | Trajkovic et al. | 340/573.1 |
| 7,764,808 B2 | 7/2010 | Zhu et al. | |
| 7,801,330 B2 | 9/2010 | Zhang et al. | |
| 8,542,872 B2* | 9/2013 | Gornick et al. | 382/103 |
| 8,571,261 B2* | 10/2013 | Gagvani et al. | 382/103 |
| 2004/0100563 A1* | 5/2004 | Sablak et al. | 348/211.4 |
| 2009/0066790 A1* | 3/2009 | Hammadou | 348/143 |
| 2009/0161981 A1* | 6/2009 | Allen | 382/275 |
| 2010/0272357 A1 | 10/2010 | Maxwell et al. | |
| 2010/0290710 A1* | 11/2010 | Gagvani et al. | 382/224 |
| 2010/0316257 A1* | 12/2010 | Xu et al. | 382/103 |
| 2011/0134245 A1* | 6/2011 | Khizhnichenko | 348/148 |
| 2012/0081552 A1* | 4/2012 | Sablak et al. | 348/169 |

OTHER PUBLICATIONS

Zadeh, "Fuzzy sets", Information and Control, vol. 8, 1965, pp. 338-353.

Jensen, "Thematic Infomation Extraction: Image Classification"; Book: Introductory Digital Image Processing a Remote Sensing perspective, Prentice Hall, 1986, Chapter 8, 62 Pages.

Irani et al., "A Unified Approach to Moving Object Detection in 2D and 3D Scenes", 1998, 21 Pages.

Emami et al., "Development of a Systematic Methodology of Fuzzy Logic Modeling", IEEE Transactions on Fuzzy Systems, vol. 6, No. 3, Aug. 1998, pp. 346-361.

A. del Amo et al., "Classifying Pixels by Means of Fuzzy Relations", Inter. J. General Systems, vol. 29, Issue 4,1999, pp. 605-621.

A. del Amo et al., "Relevance and Redundancy in Fuzzy Classification Systems", Mathware and Soft Computing, vol. 8, 2001, pp. 203-216.

A. del Amo et al., "Representation of Consistent Recursive Rules", European Journal of Operational Research, vol. 130, 2001, pp. 29-53.

Kartoun et al., "A Prototype Fuzzy System for Surveillance Picture Understanding", IASTED International Conference Visualization, Imaging, and Image Processing (VIIP 2001), Marbella, Spain, Sep. 3-5, 2001, 6 Pages.

A. del Amo et al., "Spectral Fuzzy Classification: an Application", IEEE Transactions on Systems, Man, and Cybernetics—Part C: Applications and Reviews, vol. 32, No. 1, Feb. 2002, pp. 42-48.

A. Amo et al., "Fuzzy Classification Systems", / European Journal of Operational Research 156 (2004), pp. 495-507.

Yokoyama et al., "A Contour-Based Moving Object Detection and Tracking", Proceedings of 2nd Joint IEEE International workshop on VS-Pets ICCV, 2005, pp. 271-276.

Molina et al., "Applying Fuzzy Logic in Video Surveillance Systems", Mathware & Soft Computing 12, 2005, pp. 184-198.

Yang et al., "Efficient Mean-Shift Tracking via a new Similarity Measure", Proceedings of the 2005 IEEE Computer Society Conference on Computer Vision and Pattern Recognition (CVPR'05), 8 Pages.

Yin et al., "Belief Propagation in a 3d Spatio-Temporal MRF for Moving Object Detection", IEEE Conference on Computer Vision and Pattern Recognition, 2007, CVPR '07, 8 Pages.

Porter et al., "A Change Detection Approach to Moving Object Detection in Low Fame-rate Video", Proc. of SPIE vol. 7341, 2009, 8 Pages.

C.-H. Huang et al., "A Hybrid Moving Object Detection Method for Aerial Images", Proceeding PCM'10 Proceedings of the 11th Pacific Rim conference on Advances in multimedia information processing: Part I, pp. 357-368.

Wang et al., "Moving Object Detecting System with Phase Discrepancy", ISNN'11 Proceedings of the 8th International Conference on Advances in Neural Networks, vol. 2, 2011, pp. 402-411.

Dong et al., "Real-Time Moving Object Segmentation and Tracking for H.264/AVC Surveillance Videos", 18th IEEE International Conference on Image Processing, 2011, pp. 2309-2312.

Liu et al., "Moving Object Detection Under Object Occlusion Situations in Video Sequences", Multimedia (ISM), 2011 IEEE International Symposium on Multimedia, pp. 271-278.

Mendel, "Fuzzy Logic Systems for Engineering: A Tutorial", Proceedings of the IEEE, vol. No. 83, Issue No. 3, pp. 345-377, Mar. 1, 1995.

Matlab, "Fuzzy Logic Toolbox User's Guide (Version 2)", pp. 123, Apr. 22, 2001.

Piater et al., "Multi-Modal Tracking of Interacting Targets Using Gaussian Approximations", Second IEEE International Workshop on Performance Evaluation of Tracking and Surveillance, Dec. 1, 2001.

Rosin et al., "Evaluation of Global Image Thresholding for Change Detection", Pattern Recognition Letters, vol. No. 24, Issue No. 14, pp. 2345-2356, Oct. 1, 2003.

Garcia et al., "A Multitarget Tracking Video System Based on Fuzzy and Neuro-Fuzzy Techniques", EURASIP Journal on Applied Signal Processing, vol. No. 14, pp. 2341-2358, Aug. 25, 2005.

Jun et al., "Tracking and Segmentation of Highway Vehicles in Cluttered and Crowded Scenes", Applications of Computer Vision, pp. 1-6, Jan. 7, 2008.

Maggio et al., "Video Tracking: Theory and Practice, Chapter 6: Fusion, Chapter 3.4.3 Uniform Regions", Jan. 2, 2011.

Le et al., "Appearance-Based Retrieval for Tracked Objects in Surveillance Videos", Recent Developments in Video Surveillance, pp. 39-56, Apr. 4, 2012.

European Search Report and Opinion issued in connection with corresponding EP Application No. 13186106.4 on Mar. 26, 2015.

* cited by examiner

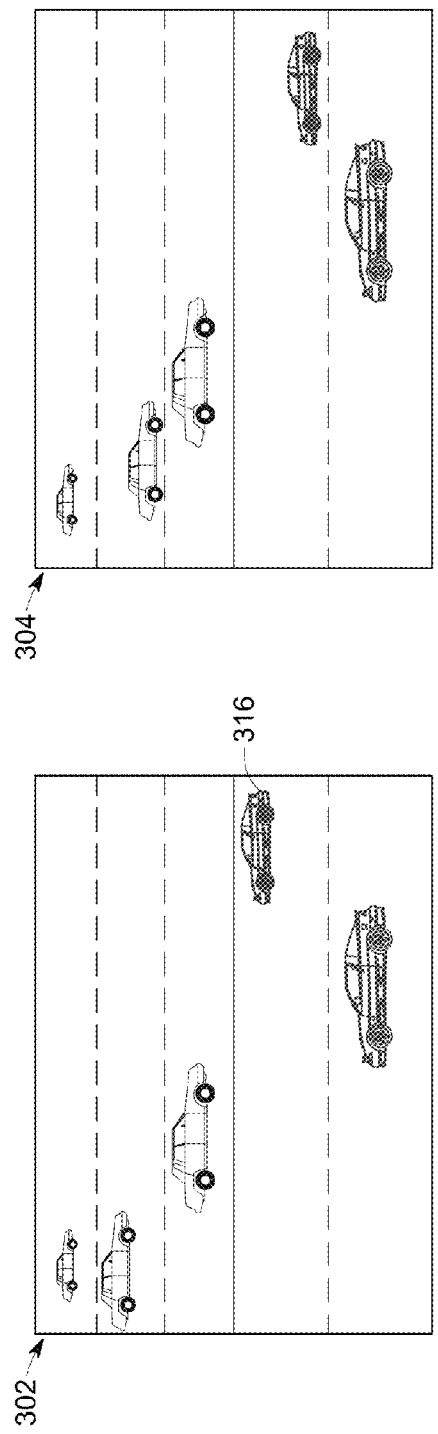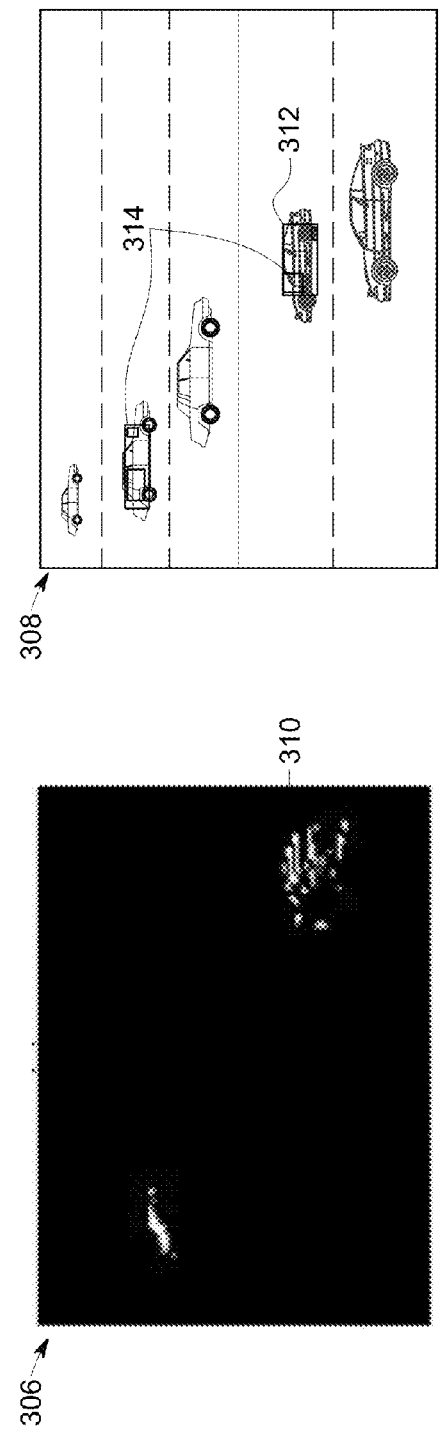
FIG. 3A
FIG. 3B
FIG. 3C
FIG. 3D

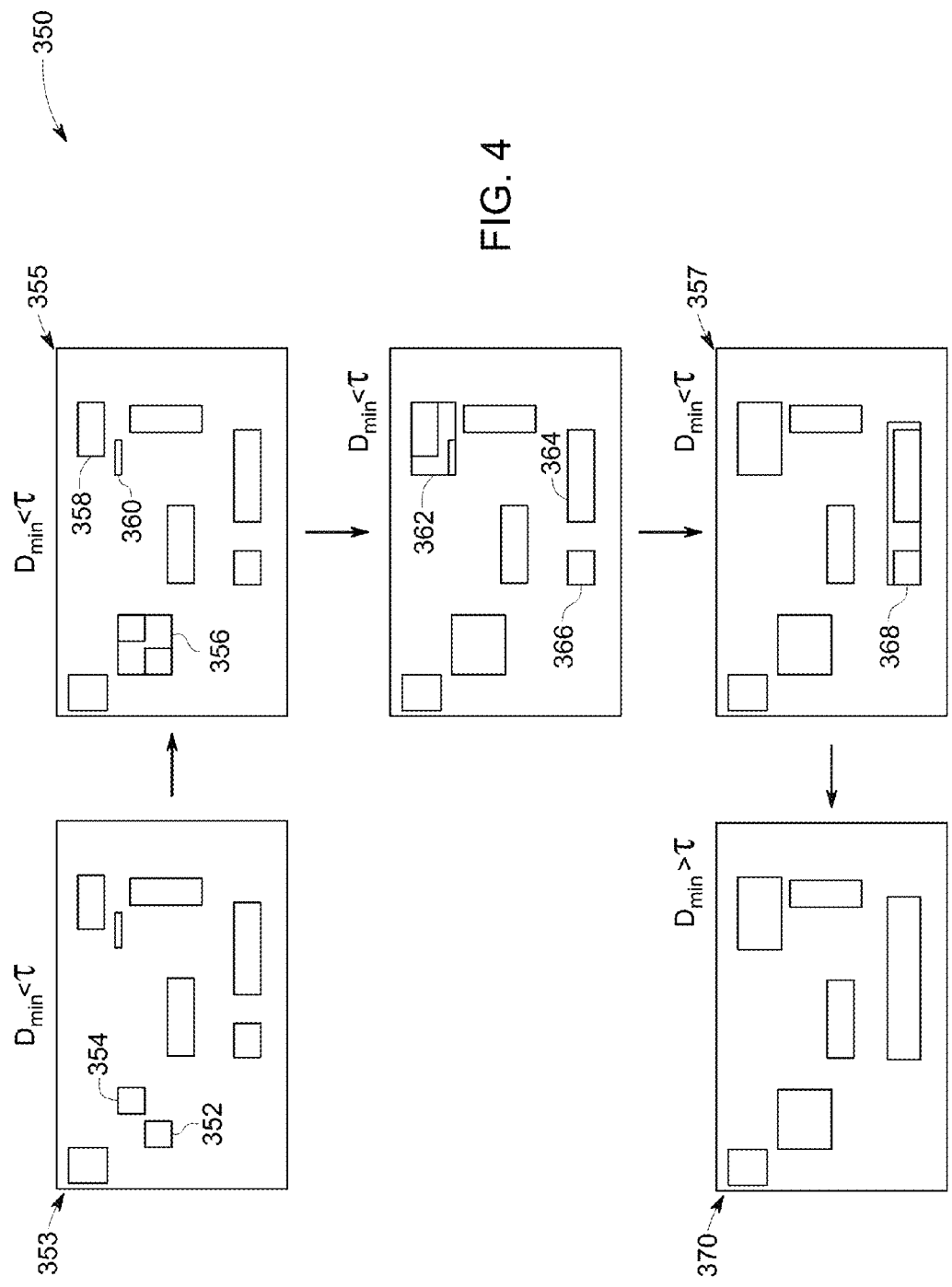

SYSTEM AND METHOD FOR DETECTION AND TRACKING OF MOVING OBJECTS

BACKGROUND

The subject matter disclosed herein generally relates to visual monitoring and video surveillance. More specifically, the subject matter relate to methods and systems for detection and tracking of moving objects in a video stream.

Video detection and tracking is an integral part of many state of the art systems such as Surveillance and Reconnaissance systems. ISR (Intelligence, Surveillance and Reconnaissance) systems encompass collection, processing, and utilization of data for supporting military operations, for example. ISR systems typically include unmanned aerial vehicles (UAVs) and ground, air, sea, or space-based equipments. Such video processing systems are used for detecting moving objects and may also be useful in areas such as traffic management, augmented reality, communication and compression.

Typically, a sequence of images extracted from a video stream, is processed to detect and track moving objects using the video processing systems. Manual method of identification and tracking of moving targets in a video stream is slow, intensive and in many cases not practical. Automated solutions have been proposed in recent years towards tackling problems associated with video surveillance. Techniques related to automatic processing of video streams has limitations with respect to recognizing individual targets in fields of views of the video cameras. In airborne surveillance systems, moving cameras pose additional noise due to parallax. Conventional algorithms that are being used to identify moving targets in an image sequence may not provide satisfactory subjective quality. Many of these algorithms are not capable of processing the data optimally because of inherent uncertainties of the real world data.

Superior techniques of video processing capable of optimally processing the real time images to reliably detect moving targets are needed.

BRIEF DESCRIPTION

In accordance with one aspect of the present technique, a method implemented using a processor based device is disclosed. The method includes receiving a video stream comprising a plurality of image frames having at least one moving object, determining a difference between at least two image frames among the plurality of image frames and generating a difference image comprising a plurality of image blobs corresponding to the at least one moving object. The method further includes generating a plurality of bounding boxes, each bounding box surrounding at least one corresponding image blob among the plurality of image blobs, and determining a subset of bounding boxes among the plurality of bounding boxes, associated with the corresponding moving object, using a fuzzy technique based on a perceptual characterization of the subset of bounding boxes. The method also includes merging the subset of bounding boxes to generate a merged bounding box enclosing the subset of bounding boxes to detect the moving object.

In accordance with one aspect of the present systems, a system is disclosed. The system includes a processor based device configured to receive from a video camera, a video stream comprising a plurality of image frames having at least one moving object, and determine a difference between at least two image frames among the plurality of image frames to generate a difference image comprising a plurality of image blobs. The processor based device is further configured to generate a plurality of bounding boxes, each bounding box surrounding at least one corresponding image blob among the plurality of image blobs, and to determine a subset of bounding boxes among the plurality of bounding boxes, associated with the corresponding moving object, using a fuzzy technique based on a perceptual characterization of the subset of bounding boxes. Finally, the processor based device is configured to merge the subset of bounding boxes to generate a merged bounding box enclosing the subset of bounding boxes to detect the moving object.

In accordance with another aspect of the present technique, a non-transitory computer readable medium encoded with a program to instruct a processor based device is disclosed. The program instructs the processor based device to receive a video stream comprising a plurality of image frames having at least one moving object, and to determine a difference between at least two image frames among the plurality of image frames to generate a difference image comprising a plurality of image blobs corresponding to the at least one moving object. The program further instructs the processor based device to generate a plurality of bounding boxes, each bounding box surrounding at least one corresponding image blob among the plurality of image blobs, and to determine a subset of bounding boxes among the plurality of bounding boxes, associated with the corresponding moving object, using a fuzzy technique based on a perceptual characterization of the subset of bounding boxes. The program also instructs the processor based device to merge the subset of bounding boxes to generate a merged bounding box enclosing the subset of bounding boxes to detect the moving object.

DRAWINGS

These and other features and aspects of embodiments of the present invention will become better understood when the following detailed description is read with reference to the accompanying drawings in which like characters represent like parts throughout the drawings, wherein:

FIGS. 3a and 3b illustrate two image frames with moving objects, FIG. 3c illustrate a difference image having a plurality of blobs, and FIG. 3d illustrate an image frame superimposed with a plurality of bounding boxes enclosing the image blobs in accordance with an exemplary embodiment;

FIG. 4 illustrates an example of an agglomerative clustering algorithm in accordance with an exemplary embodiment;

DETAILED DESCRIPTION

Embodiments of the present techniques relate to a system and method for detecting moving objects in a video stream using a fuzzy technique. A difference between at least two image frames of the video stream is determined to generate a difference image having a plurality of image blobs. As used herein, an image blob refers to the pixels or groups of pixels having non-zero values that show a difference from respective image frames. A plurality of bounding boxes are generated, each bounding box surrounding at least one corresponding image blob. A clustering technique involving a fuzzy framework is used to accurately group the bounding boxes to form a unique merged bounding box. The fuzzy framework employs fuzzy parameters associated with the bounding boxes and fuzzy rules associated with the fuzzy parameters, to generate robust decisions to merge a subset of bounding boxes to detect the moving object. Robust and accurate moving object detection in accordance with the embodiments of the present technique, reduces unnecessary computation time for later visual processing and enhances overall visual analytic performance.

Figure 1:
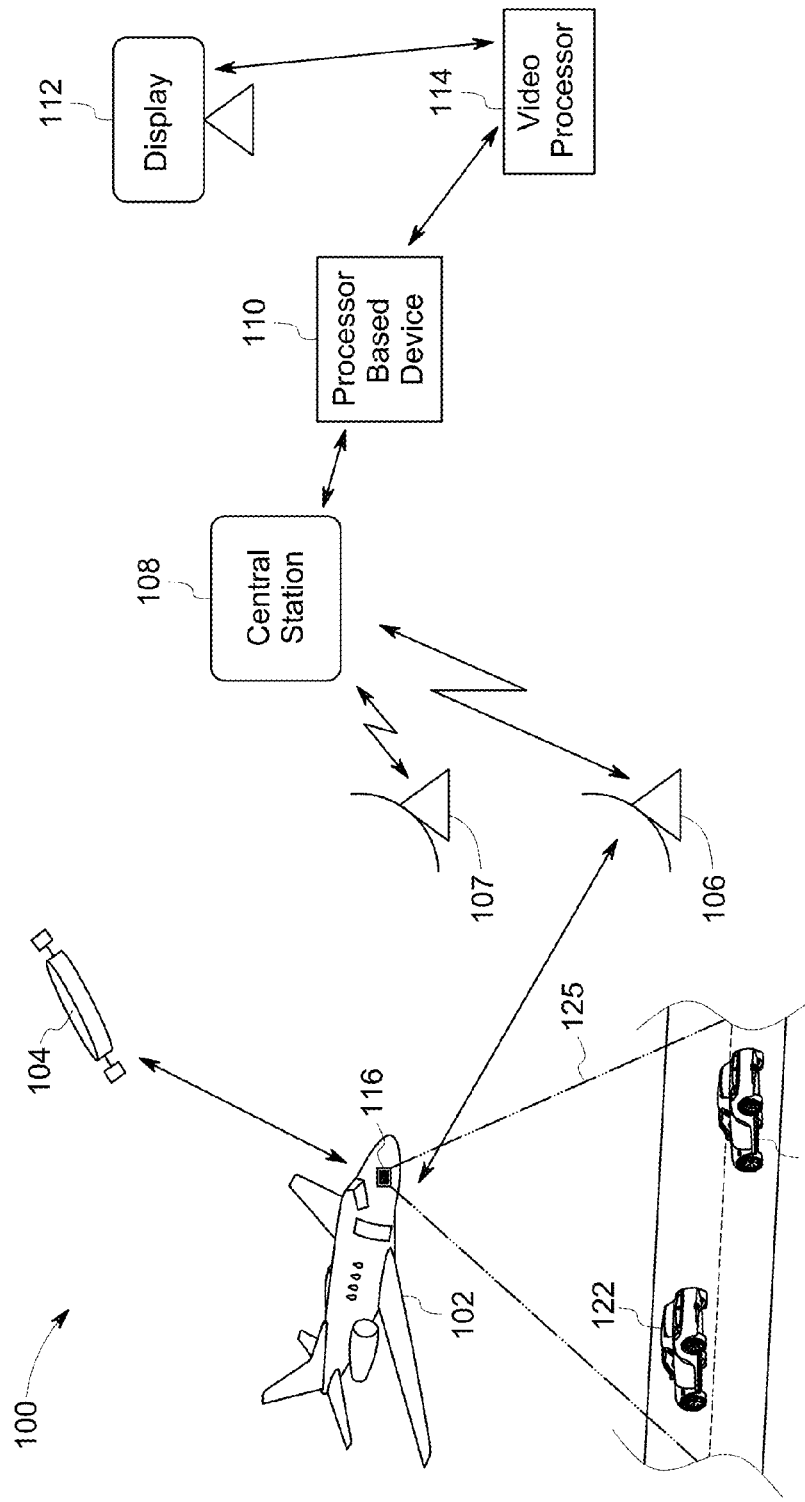
FIG. 1 is a diagrammatic illustration of a fuzzy logic based system for moving object detection and tracking, in accordance with an exemplary embodiment.

FIG. 1 is a diagrammatic illustration of an ISR (Intelligence, Surveillance and Reconnaissance) system 100 which employs a fuzzy system to detect moving objects in a video stream. In the illustrated embodiment, the ISR system 100 includes an airborne vehicle 102 capturing a video stream of a scene within a field of view 125 with moving objects 120, 122 using an onboard video camera 116. The airborne vehicle 102 may be an unmanned aerial vehicle (UAV) or a manned military surveillance aircraft. The airborne vehicle 102 in one example has a communication link with a communication satellite 104. A ground station include a plurality of communication antennas 106 and 107 configured to receive communication signals from the airborne vehicle 102 and/or the communication satellite 104 respectively. The antennas 106 and 107 may also be used to transmit signals from the ground station to the airborne vehicle 102 or to the communication satellite 104. According to one embodiment, the video stream signals captured by the camera 116 of the airborne vehicle 102 are received by the antenna 106. A central base station 108 coordinates communication between the airborne vehicle 102, the communication satellite 104, and the antennas 106, 107. The central station 108 may have access to a processor-based device 110 to provide computational resources for control and coordination activities of ISR system. The processor-based device 110 may be general purpose processor or a controller and in one embodiment is a multiple processor computing device. The processor-based device 110 has the capability to process the video stream signals received by the antenna 106. Alternatively, the processor-based device 110 may be communicatively coupled with a video processor module 114. The video processor 114 performs the task of detection of video stream objects using a fuzzy technique.

In one example, the processor based device 110 uses software instructions from a disk or from memory to process the video stream signals. The software can be encoded in any language, including, but not limited to, assembly language, VHDL (Verilog Hardware Description Language), High level languages like Fortran, Pascal, C, C++, and Java, ALGOL (algorithmic language), and any combination or derivative of at least one of the foregoing. The results of the video stream processing is stored, transmitted for further processing and/or displayed on a display 112 coupled to the video processor 114.

Figure 2:
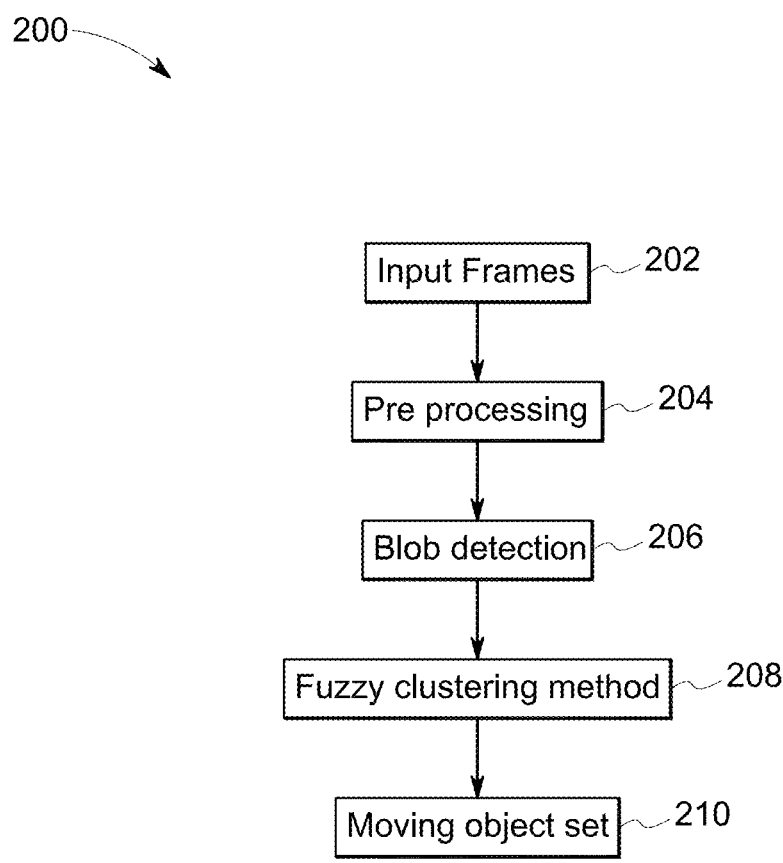
FIG. 2 is a flow chart illustrating the steps involved in determining moving objects from a video sequence in accordance with an exemplary embodiment.

FIG. 2 illustrates a flow chart 200 that illustrates techniques involved in determining moving objects from a video sequence in accordance with an exemplary embodiment. A plurality of image frames from a video stream is received by the video processing module 114 of FIG. 1 as shown in 202. The plurality of image frames includes at least one moving object to be detected. The image frames are usually pre-processed such as by techniques for noise removal and image stabilization 204. The pre-processing depends upon the quality of the image frames and the desired application.

A difference between at least two image frames among the plurality of image frames is computed to generate a difference image. The difference image refers to the changes in the pixels or groups of pixels between two image frames. The difference image is generated from successive image frames having moving objects which are at slightly different locations. Fast moving objects produce more number of non-zero pixels in the difference image and such pixels are spread in a relatively larger area. Similarly, occlusion of objects across images of a scene may produce image blobs in the difference image. A plurality of blobs corresponding to the at least one moving object are detected from the difference image 206. The blobs represent the pixels that are different among respective frames which are grouped together based on certain characteristics.

A plurality of bounding boxes is generated, wherein each bounding box surrounding at least one corresponding image blob among the plurality of image blobs. A clustering technique involving a fuzzy framework is used to group the bounding boxes to form a unique merged bounding box 208 as further detailed herein.

The fuzzy clustering technique detects moving objects 210 using an agglomerative clustering algorithm in a fuzzy framework. It should be noted herein that the agglomerative clustering algorithm determines a subset of bounding boxes among the plurality of bounding boxes, associated with the corresponding moving object using a fuzzy technique. The subset of bounding boxes is merged to generate a merged bounding box enclosing the subset of bounding boxes. The merged bounding box enclosing the subset of bounding boxes is used to determine a moving object of the video stream. The fuzzy technique is based on a perceptual characterization of the subset of bounding boxes. The perceptual characterization of the subset of bounding boxes is defined in terms of "geometrical", "motion" and "appearance" properties of the subset of bounding boxes. The fuzzy technique uses perceptual characteristics to define fuzzy parameters in terms of fuzzy sets defined using suitable membership functions. A fuzzy decision rule is formulated based on the plurality of fuzzy parameters to determine the subset of bounding boxes for merging. The steps discussed herein are discussed in greater details with reference to subsequent figures.

FIGS. 3a-3d illustrates an example of a plurality of image frames 300 in a video stream, having moving objects that are used for generating a plurality of bounding boxes. In the illustrated embodiment of FIGS. 3a-3b, two image frames of the video stream 302 and 304 are considered. Two blobs between the image frames 302 and 304 are illustrated in a difference image 306 shown in FIG. 3c. The blobs include a plurality of frame differences contributed by moving objects, parallax and noise. The blobs due to moving objects exhibit similar pattern across consecutive difference images. Blobs due to noise and parallax may not show such a similar pattern. A plurality of image blobs 310 detected from the difference image 306 are considered for further processing in order to detect moving objects. It should be noted herein that the frame difference images associated with parallax and noise are not typically distinguished from the frame differences associated with moving objects. It should further be noted herein that the processing of the blobs corresponding to the moving objects, parallax and noise are performed using an exemplary algorithm discussed in further detail below. The area around the blobs represents pixels of the consecutive image frames with no differences. According to one embodiment, the identification of the image blobs within a bounding box takes into account properties in addition to the mere proximity location of the differing pixels. For example, the differences between image frames may include separate moving objects in close proximity and the pixels are distinguished according to features such as color.

In FIG. 3d, a plurality of bounding boxes 314 enclosing one or more image blobs 310 is superimposed on the image frames 302. In an alternate embodiment, the bounding boxes 314 may also be superimposed on the entire image frame 304 or a portion of the image frame 304 such as half of the frame. A single blob or a plurality of blobs 310 in close proximity are enclosed in each the bounding box 314. The size of the bounding box 314 may vary depending upon the number and size of the blobs. Each moving object on the image frame occupies same area as that of a subset of blobs in the difference image. The subset of bounding boxes 314 enclosing the image blobs 310 are merged by employing a clustering technique to generate a merged bounding box 312 enclosing the subset of bounding boxes. The clustering technique is explained in greater detail below. Thus, the moving objects are thus identified in the image frame and defined within the bounding box.

FIG. 4 illustrates an agglomerative clustering algorithm used for generating the merged bounding box 312. The agglomerative clustering algorithm is initiated by considering an initial set of bounding boxes in an image frame 350. At each step of the processing, a measure of dissimilarity (denoted by D) between every pair of bounding boxes is determined. As previously noted, the bounding boxes from FIG. 3a-3d identify the groups of pixels with certain characteristics. The measure of "dissimilarity" may be based on a characterization of the pair of bounding boxes. The characterization of the pair of bounding boxes may be defined based on at least one property associated with the pair of bounding boxes. For example, in one embodiment, the characterization of a pair of bounding boxes may be based on the geometrical properties of the pair of bounding boxes such as a size or proximity of the pair of bounding boxes. In another embodiment, the characterization may be based on the motion properties of the pair of bounding boxes in the video stream such as speed and cohesion of the movement of the pair of bounding boxes. In yet another embodiment, the characterization of a pair of bounding boxes may be based on similarity of contents of the pair of bounding boxes such as texture, color, or the like of the pair of bounding boxes. The characterization of a pair of bounding boxes may be based on a deterministic function or a fuzzy function or a combination of both the functions. In certain embodiments, a plurality of characterization techniques of a pair of bounding boxes may be used and such characterizations may be fused to characterize the pair of bounding boxes. It should be noted herein that the characterization techniques of the present system is capable of capturing perceptual factors aiding superior clustering of the bounding boxes. In more particular detail the perceptual factors include features such as geometrical, motion and/or appearance properties.

In the illustrated embodiment, the pair of bounding boxes with least value of D (denoted as "$D_{min}$") is selected. For example, in a first iteration, bounding boxes 352 and 354 with least distance between them are identified. If the minimum distance $D_{min}$ is lesser than a threshold T, the nearest bounding boxes are merged. For example, as shown in image frame 353, the bounding boxes 352 and 354 are merged into a single merged bounding box 356 when the minimum distance between them is less than the threshold. The total number of bounding boxes in the next iteration of the clustering is one less than the number of bounding boxes in the previous iteration. In the illustrated embodiment shown in image frame 355, the bounding boxes 358 and 360 are merged into a merged bounding box 362 in the second iteration of the clustering. Similarly, the bounding boxes 364 and 366 are merged into a merged bounding box 368 in the third iteration as depicted in image frame 357. As shown in the example, the least measure of dissimilarity among the bounding boxes $D_{min}$ in the next iteration for image frame 370 is greater than the threshold τ and hence the clustering algorithm is terminated.

Figure 5:
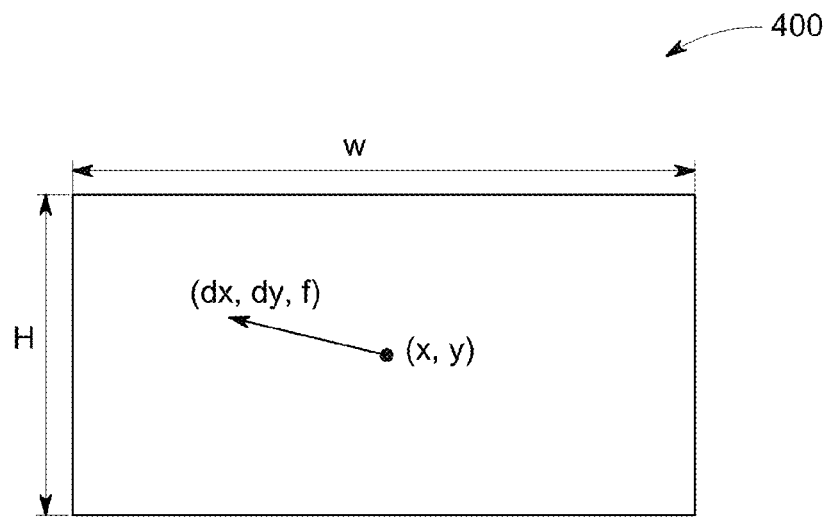
FIG. 5 illustrates a bounding box as defined in an exemplary embodiment.

FIG. 5 illustrates a bounding box 400 in accordance with an exemplary embodiment of the present technique. A bounding box B is defined as:

$$B=\{W,H,x,y,dx,dy,f,T\},$$

where W is the width of the box, H is the height of the box, the point (x, y) is the coordinates of a center of the box, (dx,dy,f) represents the motion properties of the box in XY plane with (dx,dy) representing the motion vector with a motion confidence measure f. T represents the texture of the image patch within the bounding box B. Texture is referred to as a pattern of pixels and provides a measure of variation in intensity of a surface. The area of the bounding box denoted as A is the product of box width W and box height H. The parameters W, H, x, y are related to geometrical properties of the bounding box. Similarly, the parameters dx, dy and f are related to motion properties of the bounding box. The parameter T is related to appearance properties of the bounding box.

Figure 6:
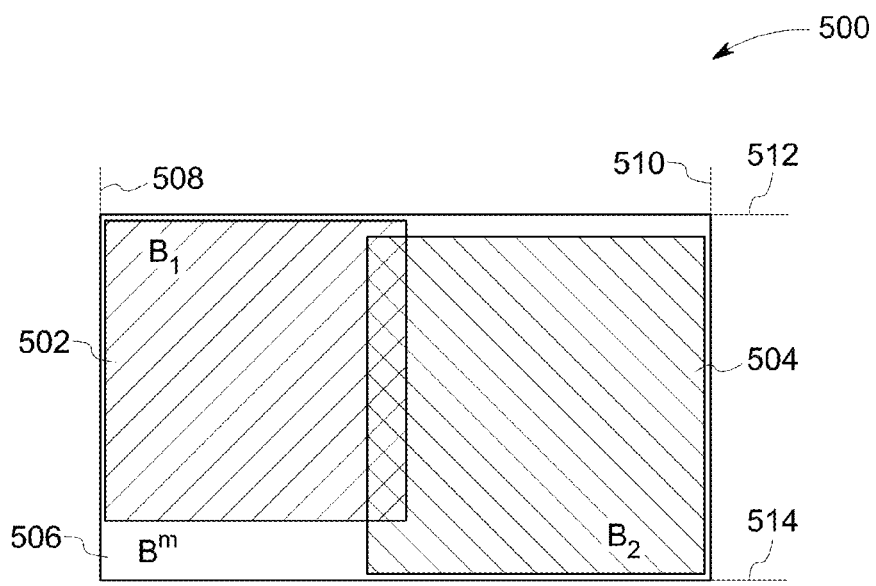
FIG. 6 illustrates a merged bounding box generated from a pair of smaller bounding boxes in accordance with an exemplary embodiment.

FIG. 6 illustrates an exemplary merging operation of a pair of bounding boxes $B_1$ and $B_2$, indicated by 502, 504 respectively, generating a merged bounding box $B^m$ indicated by 506. The merged bounding box $B^m$, indicated by 506, is defined as:

$$B^m=\{W^m,H^m,x^m,y^m,dx^m,dy^m,f^m,T^m\}$$

where, $W^m$ is the width, $H^m$ is the height, $(x^m, y^m)$ is the center, $(dx^m, dy^m, f^m)$ represents the motion properties and $T^m$ is the texture of the merged bounding box. The parameters of the bounding box $B^m$ may be defined in terms of the parameters defining the bounding boxes $B_1$ and $B_2$ .... The bounding boxes $B_1$ and $B_2$ are denoted as:

$$B_1=\{W_1,H_1,x_1,y_1,dx_1,dy_1,f_1,T_1\} \text{ and}$$

$$B_2=\{W_2,H_2,x_2,y_2,dx_2,dy_2,f_2,T_2\}$$

where, $W_1$, $W_2$ representing widths of the bounding boxes, $H_1$, $H_2$ representing the heights of the bounding boxes, $(x_1,y_1)$, $(x_2, y_2)$ representing the center points of the bounding boxes, $(dx_1,dy_1,f_1)$, $(dx_2,dy_2,f_2)$ representing the motion properties of the bounding boxes and $T_1$, $T_2$ representing textures of bounding boxes $B_1$, $B_2$ respectively. The coordinates corresponding to extreme left 508, right 510, top 512 and bottom 514 coordinates of merged bonding box Bm based on parameters corresponding to bounding boxes B1 and B2, denoted by terms $x^m$, $x_r^m$, $y_t^m$, $y_b^m$, are defined as:

$$x_l^m = \min\{x_1 - W_1/2, x_2 - W_2/2\}$$

$$x_r^m = \max\{x_1 + W_1/2, x_2 + W_2/2\}$$

$$y_t^m = \max\{y_1 + H_1/2, y_2 + H_2/2\}$$

$$y_b^m = \min\{y_1 - H_1/2, y_2 - H_2/2\}$$

With the above notions, the parameters of the merged bounding box are defined as, $$W^m = x_r^m - x_l^m$$

$$H^m = y_t^m - y_b^m$$

$$x^m = (x_r^m + x_l^m)/2$$

$$y^m = (y_b^m + y_t^m)/2$$

$$dx^m = (f_1^{A1f} dx_1 + f_2^{A2f} dx_2)/(f_1^{A1f} + f_2^{A2f})$$

$$dy^m = (f_1^{A1f} dy_1 + f_2^{A2f} dy_2)/(f_1^{A1f} + f_2^{A2f})$$

$$f^m = f_1^{A1f} f_2^{A2f}$$

$$T^m = I(y_t^m : y_b^m, x_l^m : x_r^m)$$

with the notations, $$A1f = A_1/(A_1 + A_2)$$

$$A2f = A_2/(A_1 + A_2)$$

Here, the notations $A1f$ and $A2f$ are fraction of the area of bounding boxes $B_1$ and $B_2$ respectively. A pair of bounding boxes may be characterized in terms of shared property of the bounding boxes. For example, a pair of bounding boxes may be characterized in terms of geometrical, motion and appearance properties of the pair of bounding boxes. Such properties are suitable for characterizing a pair of bounding boxes since such properties are closely associated to the perceptual characteristics of the associated images.

In one embodiment of the technique, a characteristic parameter may be defined for a pair of bounding boxes in terms of geometric properties of the pair of bounding boxes. A geometric property that may be considered, is representative of a geometrical affinity of a pair of bounding boxes $B_1$ and $B_2$ and is defined as:

$$AF(B_1, B_2) = \frac{A(B_1 \cup B_2)}{A_m} \in [0, 1],$$

Where, $A_m$, is the area of the merged bounding box $B_m$ enclosing the bounding boxes $B_1$ and $B_2$. The area $A_m$ is the product of merged box width $W^m$ and merged box height $H^m$. When a pair of bounding boxes is very near, affinity AF is approximately equal to one. For a pair of bounding boxes that are too far apart, the affinity AF is approximately equal to zero. In another embodiment, a characteristic parameter may be defined in terms of motion properties of the pair of bounding boxes. A motion property that may be considered is representative of a motion cohesion of a pair of bounding boxes $B_1$ and $B_2$ and is defined as:

$$MC(B_1, B_2) = \frac{V_1^T V_2}{\|V_1\| \|V_2\|} \in [-1, 1]$$

where, $V_1 = (dx_1, dy_1)$ and $V_2 = (dx_2, dy_2)$ are the motion vectors of box $B_1$ and $B_2$ respectively. When the pair of bounding boxes $B_1$ and $B_2$ moving along a same direction, a motion cohesion value "MC" will be approximately plus one (+1). Similarly, when the pair of bounding boxes is moving in opposite directions, the motion cohesion "MC" is approximately equal to minus one (−1). In another embodiment, a characteristic parameter may be defined in terms of appearance properties of the bounding boxes. An appearance property that may be considered, is representative of an appearance similarity of the pair of bounding boxes $B_1$ and $B_2$ and is defined as:

$$AS(B_1, B_2) = \frac{1}{MN} \sum_{i=1}^{M} \sum_{j=0}^{N} e^{\left\|\frac{u_i - v_j}{\sigma}\right\|^2} \in [0, 1]$$

where the box $B_1$ has a texture $T_1 = \{u_i\}_{i=1 \text{ to } N}$ and the box B2 has a texture $T_2 = \{v_j\}_{j=1 \text{ to } M}$ with $\{u_i\}_{i=1 \text{ to } N}$ and $\{v_j\}_{j=1 \text{ to } M}$ indicating N and M dimensional texture values. The parameter a controls contribution of similarity measure of pixel intensities to the appearance similarity of the bounding boxes $B_1$ and $B_2$. An empirical value $\sigma=10$ may be used in determining appearance similarity of the pair of bounding boxes. When the textures $T_1$ and $T_2$ are similar, the appearance similarity "AS" is approximately equal to one. When there is no similarity between the textures $T_1$ and $T_2$, the appearance similarity "AS" is approximately to zero.

Figure 7:
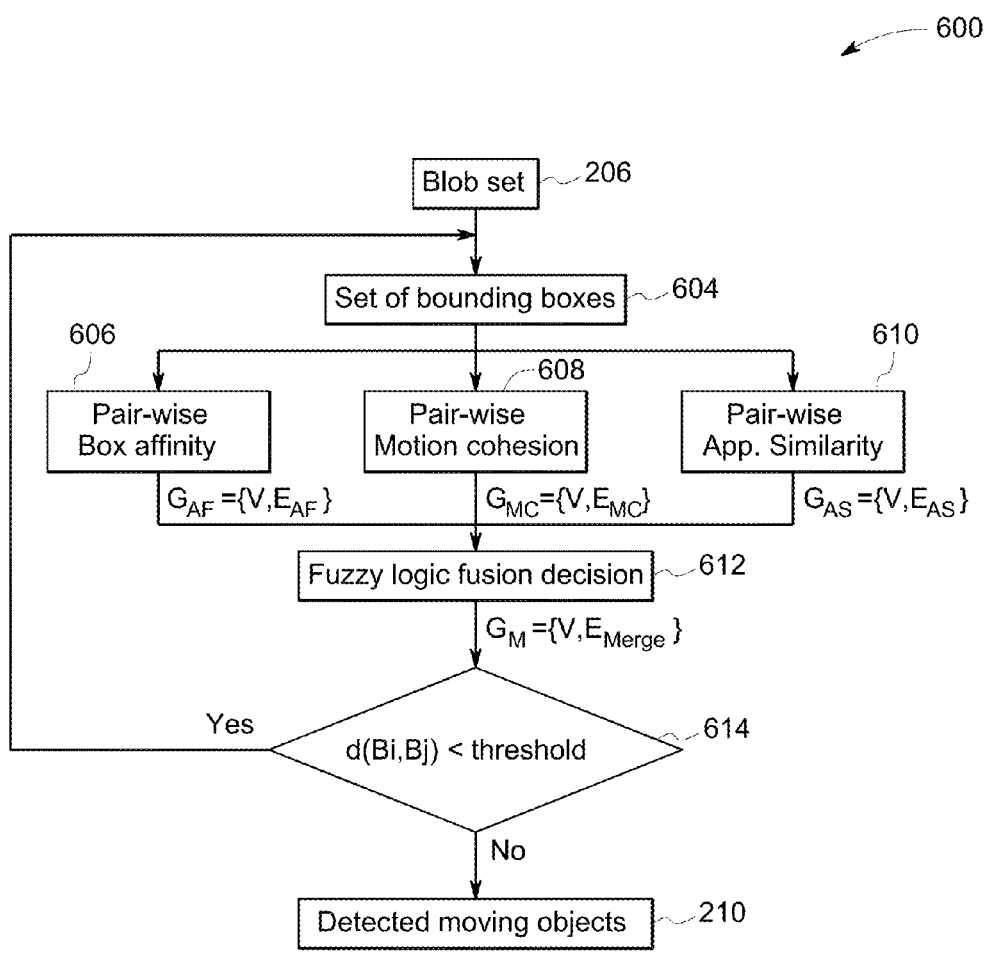
FIG. 7 is a flow chart illustrating the steps involved in a fuzzy technique in accordance with an exemplary embodiment.

FIG. 7 is a flow chart 600 illustrating the exemplary steps involved in the fuzzy technique in accordance with an exemplary embodiment of the present process. The processing commences with a plurality of image blobs detected as mentioned in 206 of FIG. 2, and is considered for generating a set of bounding boxes. The set of bounding boxes is used as an input for the agglomerative clustering algorithm. In each iteration of the agglomerative clustering algorithm, each pair of the set of bounding boxes 604 is characterized by a plurality of fuzzy parameters. The fuzzy parameter may be based on a characteristic parameter related to a property associated with the corresponding pair of bounding boxes.

The fuzzy parameter is a fuzzy variable (alternatively, a linguistic variable) defined as a set of linguistic variables referred to as "fuzzy sets". A linguistic variable is defined based on a characteristic parameter in association with a membership function. A particular value for a fuzzy variable may be associated to a plurality of fuzzy sets. The degree of membership of the value of the fuzzy variable is determined based on the membership function. For example, a box affinity fuzzy parameter 606 is defined as:

[LOWAFFINITY] $C^l_{AF} = \{x, \Gamma(x;0,0.2) | x \in [0,1]\}$

[MEDIUMAFFINITY] $C^m_{AF} = \{x, \Gamma(x;0.5,0.2) | x \in [0,1]\}$

[HIGHAFFINITY] $C^h_{AF} = \{x, \Gamma(x;1,0.2) | x \in [0,1]\}$ where the terms [LOW Affinity], [MEDIUM Affinity] and [HIGH Affinity] indicated by $C^l_{AF}$, $C^m_{AF}$ and $C^h_{AF}$ respectively are linguistic terms of the fuzzy set corresponding to the box affinity fuzzy parameter, x=AF (B1, B2) is representative of the box affinity for $B_1$ and $B_2$ and $\Gamma(x;\mu,\sigma)$ is a Gaussian membership function with a mean "$\mu$" and a standard deviation "$\sigma$". The membership function $\Gamma$ is used to fuzzify a deterministic variable into a fuzzy variable. As another example, a motion cohesion fuzzy parameter 608 is defined as:

[LOWCohesion] $C^l_{MC}=\{x,\Gamma(x;-1,0.5)|x\epsilon[-1,1]\}$

[MEDIUMCohesion] $C^m_{MC}=\{x,\Gamma(x;0,0.5)|x\epsilon[-1,1]\}$

[HIGHCohesion] $C^h_{MC}=\{x,\Gamma(x;1,0.5)|x\epsilon[-1,1]\}$ where x=MC (B1, B2) is the motion cohesion for bounding boxes $B_1$ and $B_2$. The terms [Low Cohesion], [MEDIUM Cohesion] and [HIGH Cohesion] indicated by $C^l_{MC}$, $C^m_{MC}$ and $C^h_{MC}$ respectively are linguistic terms of fuzzy parameter defined based on motion cohesion. $\Gamma(x,\mu,\sigma)$ is a Gaussian membership function with the mean "$\mu$" and the standard deviation "$\sigma$". As yet another example, an appearance similarity fuzzy parameter 610 is defined as,

[SimilarityLOW] $C^l_{AS}=\{x,\Gamma(x;-1,0.5)|x\epsilon[0,1]\}$

[SimilarityMEDIUM] $C^m_{AS}=\{x,\Gamma(x;0,0.5)|x\epsilon[0,1]\}$

[SimilarityHIGH] $C^h_{AS}=\{x,\Gamma(x;1,0.5)|x\epsilon[0,1]\}$ where x=AS (B1, B2) is the motion cohesion for bounding boxes $B_1$ and $B_2$. The terms [Similarity Low], [Similarity MEDIUM] and [Similarity HIGH] indicated by $C^l_{AS}$, $C^m_{AS}$ and $C^h_{AS}$ respectively are linguistic terms of similarity appearance fuzzy parameter. $\Gamma(x,\mu,\sigma)$ is a Gaussian membership function with the mean "$\mu$" and the standard deviation "$\sigma$". The steps 612, 614 and 210 are discussed further with reference to FIG. 8.

Figure 8:
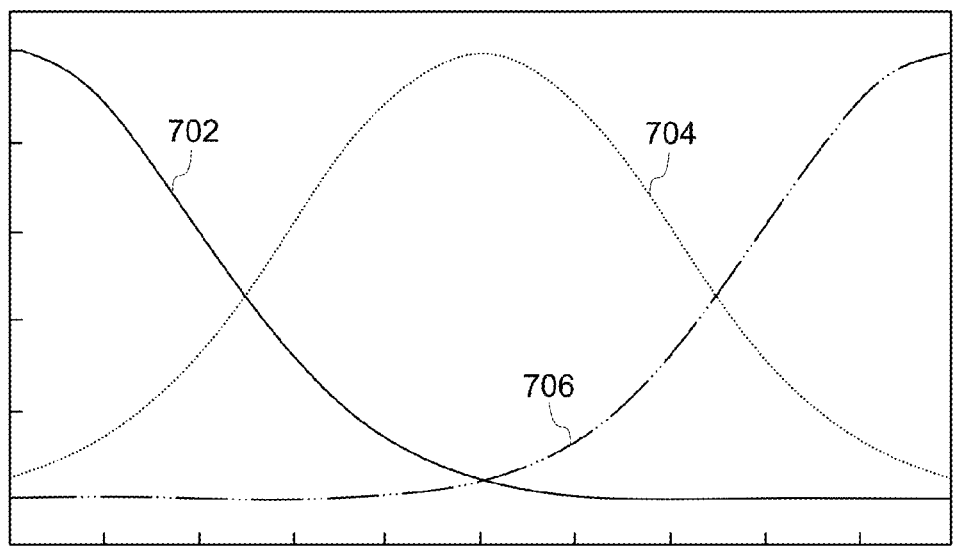
FIG. 8 illustrates membership functions used in fuzzy parameters employed in accordance with an exemplary embodiment.

FIG. 8 illustrates membership functions used in fuzzy parameters employed in accordance with an exemplary embodiment. The value of box affinity characteristic parameter is represented by the X-axis and the degree of membership is represented by the Y-axis. The curves 702, 704, and 706 are representative of membership functions of the geometric affinity fuzzy parameter. The curve 702 is representative of the membership function of the linguistic term [LOW Affinity]. The curve 704 is representative of membership function associated with the linguistic term [MEDIUM Affinity]. The curve 706 is representative of the membership function associated with the linguistic term [HIGH Affinity].

The decision rule employed by the agglomerative clustering algorithm outlined in FIG. 7 is outlined herein. The decision rule 612 operates based on at least one of fuzzy parameters. The decision rule receives at least one input variable and generates at least one decision variable. The input and output variables may be deterministic or fuzzy in nature. A fuzzy rule may receive at least one of an input linguistic variable and generates an output which may also be a linguistic variable. A fuzzy decision rule, in accordance with an embodiment of the present technique, may accept one or more fuzzy parameters viz box affinity fuzzy parameter, motion cohesion fuzzy parameter and appearance similarity fuzzy parameter to generate a fuzzy decision. The fuzzy decision variable, referred to as a box merge, is defined in a look up table given below based on the input fuzzy parameters.

TABLE 1

| | Low Cohesion | Median Cohesion | High Cohesion |
| --- | --- | --- | --- |
| Similarity low | | | |
| Low Affinity | No | No | No |
| Median Affinity | No | No | No |
| High Affinity | No | Maybe | Maybe |
| Similarity median | | | |
| Low Affinity | No | No | No |
| Median Affinity | No | No | Maybe |
| High Affinity | Maybe | Maybe | Merge |
| Similarity high | | | |
| Low Affinity | No | No | No |
| Median Affinity | Maybe | Maybe | Merge |
| High Affinity | Maybe | Merge | Merge |

The fuzzy rules of the Table-1 considers cohesion, affinity and similarity measures to determine the box merge decision variable. Each of these measures takes one of the three values—"low", "median" and "high". As an example, when the value of the affinity measure between the bounding boxes to be merged is "low", the box merge parameter is set to "No" prohibiting merging of the bounding boxes. In another example, when the value of the affinity measure and the value of the cohesion measure are "high", the box merge parameter is set to "Merge" allowing merging of the bounding boxes provided the value of the similarity measure is not low. Other entries of the table are interpreted in a similar manner. The fuzzy box merging decision is defined by a linguistic variable defined by:

[No] $C^{no}_M=\{x,\Gamma(x;0,0.1)|x\epsilon[-1,1]\}$

[Maybe] $C^{maybe}_M=\{x,\Gamma(x;0.5,0.1)|x\epsilon[-1,1]\}$

[Yes] $C^{yes}_M=\{x,\Gamma(x;1,0.1)|x\epsilon[-1,1]\}$ where x=Merge(B1,B2) is a box merging decision based on geometric affinity, motion cohesion and appearance similarity of a pair of bounding boxes. The terms [No], [Maybe] and [Yes] indicated by $C^{no}_M$, $C^{maybe}_M$ and $C^{yes}_M$ respectively are linguistic terms of fuzzy parameter defined based on box merging decision. $\Gamma(x,\mu,\sigma)$ is a Gaussian membership function with the mean "$\mu$" and the standard deviation "$\sigma$". The fuzzy rule of Table-1 is based on an intuitive logic. When the affinity between a pair of bounding boxes is low, the boxes are not merged. Boxes are merged when box affinity is high unless both the motion cohesion and appearance similarity are very low.

A measure of distance between two bounding boxes may be defined based on the output linguistic variable as:

$$d(B_i,B_j)=1-\text{Merge}(B_i,B_j), i,j=1,2,\ldots,n$$

assuming that set of bounding boxes B={B1, B2, ..., Bn} has n bounding boxes. Here, d(Bi,Bj) is the distance measure, and the "Merge" is derived from the fuzzy decision rule of Table-1. The agglomerative clustering algorithm determines the distance d between all possible combinations of bounding boxes, and selects a particular pair of bounding boxes to be merged when the distance "d" between the particular pair of bounding boxes is smaller than a threshold "$\tau$". When the distance between the particular pair of bounding boxes is smaller than the threshold "$\tau$", as determined in 614, another iteration of the agglomerative clustering algorithm is initiated. Again, another pair of bounding boxes with least distance measure $D_{min}$ is identified and merged into a merged bounding box. When the minimum distance "$D_{min}$" is greater than the threshold value "$\tau$", the agglomerative clustering algorithm is terminated. After the termination, the remaining merged bounding boxes in 210 are considered as detected moving objects. The agglomerative clustering method is summarized as follows:

```
Let • C_|B| = {B | B ⊂ B}
for • i =| B | −1,...1 • do
•••Compute • pair − wise • dis tan ce • set • D = {d(B_j , B_k ) | B_j, B_k ⊂ C_{i+1} }
•••if • D_min > τ • then
••••••return • C_{i+1}
•••endif
•••Merge • B_p, B_q ⊂ C_{i+1} with • d (B_p, B_q ) = D_min • to • B_m
•••C_i = {B_m, C_{i+1} − {B_p, B_q}}
endfor
return • C_1
```

$C_{|B|}$ represents the set of bounding boxes represented by a plurality of bounding boxes "B" with initial number of bounding boxes indicated by $|B|$. The agglomerative algorithm is performed iteratively with maximum number of iterations equal to the initial number of bounding boxes of the set $C_{|B|}$. A distance D is used to evaluate the similarity of all pairs of bounding boxes $B_j$ and $B_k$. The pair of bounding boxes with minimum distance measure $D_{min}$ is merged reducing the dimensionality of the set $C_{|B|}$ by one. The iteration terminates if the minimum distance between a particular pair of bounding boxes is greater than a predetermined threshold $\tau$. The number of remaining bounding boxes at the termination of the iterative loop is the output of the clustering algorithm.

In one embodiment of the present technique, sizes of the bounding boxes may be considered while determining the boxes to be merged. A pair of bounding boxes is merged if the resultant merged bounding box is relatively smaller in size. Alternatively, a pair of bounding boxes is not merged if the resulting merged bounding box is too large, A linguistic variable based on merged bounding box size is defined as:

[Box·large] $C^l_{SZ}=\{x, Z(x;2,20)|x\epsilon[0,40]\}$

[Box·normal] $C^m_{SZ}=\{x, \Gamma_2(x;10,4,20,2)|x\epsilon[0,40]\}$

[Box·small] $C^s_{SZ}=\{x, \Gamma(x;0,6)|x\epsilon[0,40]\}$ where, $x=SZ(B_1,B_2)=(A(B_m))^{1/2}$ is the square root of the area of the merged bounding box $B_m$. The terms [Box large], [Box normal] and [Box small] indicated by $C^l_{SZ}$, $C^m_{SZ}$ and $C^s_{SZ}$ respectively are linguistic terms of fuzzy parameter defined based on box merging decision. $Z(x:a,c)$ is a sigmoid membership function $1/(1+e^{-a(x-c)})$, and $\Gamma_2(x,\mu1,\sigma1,\mu2,\sigma2)$ is a Gaussian combination membership function whose left shape is defined by Gaussian function $\Gamma(x,\mu1,\sigma1)$, and whose right most shape is defined by Gaussian function $\Gamma_2(x,\mu2,\sigma2)$. The terms "$\mu_1$" and "$\mu_2$" are mean values and $\sigma_1$ and $\sigma_2$ are corresponding standard deviations. When the merged bounding box size "SZ" is normal, agglomerative clustering algorithm is used with fuzzy rules of Table-1. Otherwise, following two rules are considered along with the rules outlined in Table-1 while identifying a pair of bounding boxes.
IF SZ is large, NO Merge;
IF SZ is small, AND IF AF is NOT Low Affinity, Merge is OK In some embodiments, the performance of the fuzzy based agglomerative algorithm may be compared with a non-fuzzy based technique. A heuristic product fusion rule may be used in an embodiment of non-fuzzy box merging method. The distance metric may be defined as:

$$d(B_i,B_j)=1-(AF(B_i,B_j)\cdot MC(B_i,B_j)\cdot AS(B_i,B_j))^{1/2}, i,j=1, 2, \ldots, n,$$

with the condition that $d(B_i, B_j)=1$, when SZ>25. Here, AF, MC and AS represent geometric affinity, motion cohesion and appearance similarity of bonding boxes $B_i$ and $B_j$. SZ represents the size of the merged bounding box. The performance of fuzzy based method with the non-fuzzy method may be compared with respect to failures modes of the box merging algorithm. Two failure modes are generally considered for a box merging algorithm.
1. Under merge: The moving object is covered by multiple initial bounding boxes. The algorithm fails to merge them into one merged bounding box.
2. Over merge: The initial bounding boxes of two or more moving objects are merged into a merged bounding box.

For each of the clustering algorithm, the number of moving objects whose initial bounding boxes are under merged are counted. Similarly, the number of moving objects whose initial bounding boxes are over merged are counted. The percentage of under-merge and over-merge failures with respect to the total number of moving objects for the two bounding box merging methods are summarized in the table below:

TABLE 2

| % | Under merge | Over merge | Correct merge |
|---|---|---|---|
| Product fusion metric | 44.8 | 16.7 | 38.5 |
| Fuzzy distance metric | 5.2 | 2.1 | 92.7 |

The entries of the Table-2 confirm the superior performance of the Fuzzy distance metric compared to the product fusion metric. The proposed algorithm of the present embodiment exhibits significant reduction in under merge failures (from 44.8% to 5.2%), over merge failures (16.7% to 2.1%). Fuzzy distance metric performs increased percentage of correct merges (from 38.5% to 92.7%).

Figure 9A:
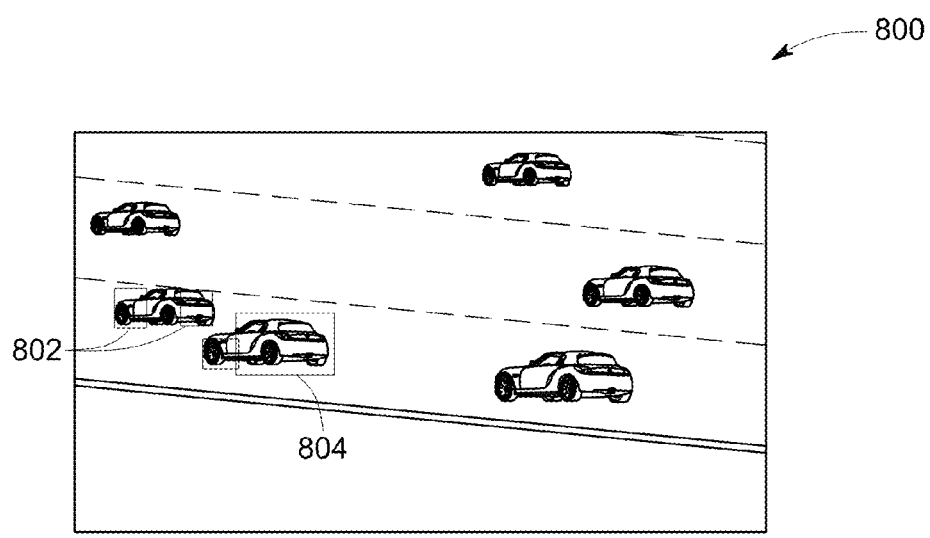
FIGS. 9a-9c illustrate the performance of an exemplary embodiment of the fuzzy technique compared with the conventional product fusion method in overcoming an over merged failure mode.
Figure 9B:
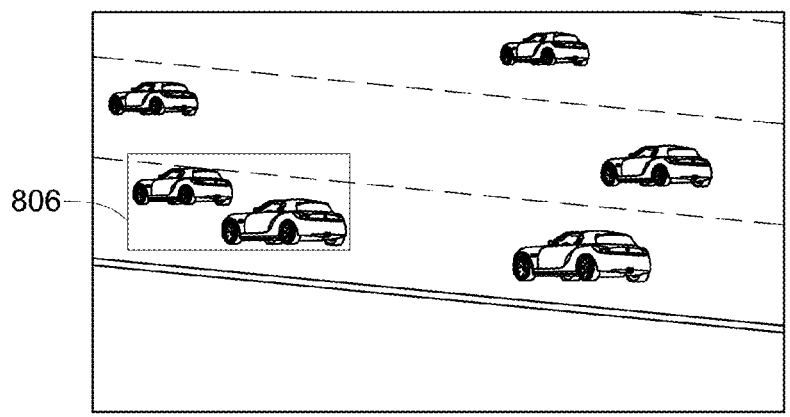
Figure 9C:
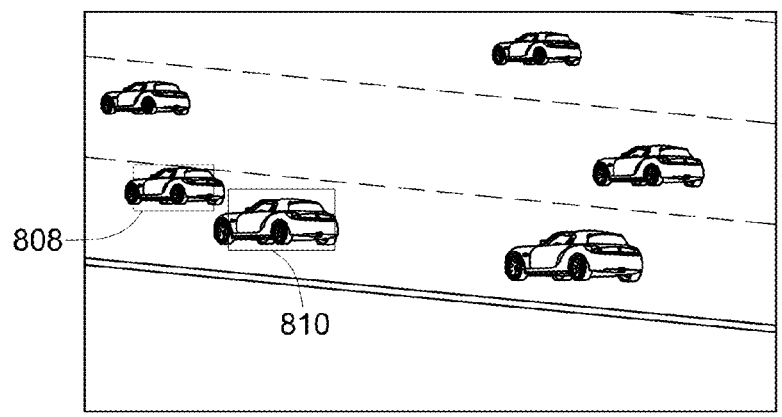

FIGS. 9a-9c illustrate the performance of an exemplary embodiment of the fuzzy technique compared with the conventional product fusion method. The initial set of bounding boxes used for both the methods are shown in FIG. 9a. The moving object detection results by box merging with heuristic distance metric are shown in FIG. 9b. The figure shows that there are two moving objects 802 and 804 in the scene that have been detected as a single bounding box 806. The moving object detection results by fuzzy box merging distance metric are shown in FIG. 9c. The same moving objects that were detected as a single bounding box in FIG. 9b are detected as two bounding boxes 808 and 810. The value of "$\tau$" used in both the algorithm is 0.3. The results show the superior performance of the fuzzy method in overcoming the over merged failure mode.

Figure 10A:
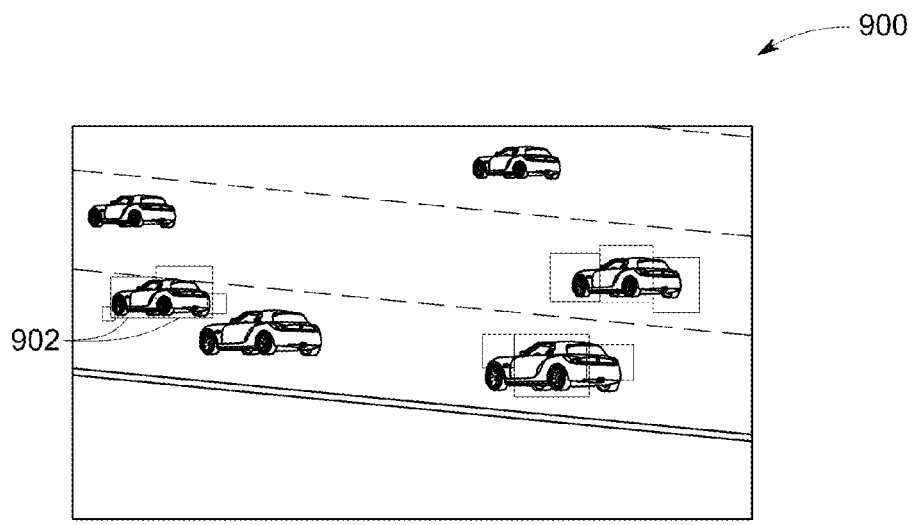
FIGS. 10a-10c illustrates the performance of an exemplary embodiment of the fuzzy technique compared with the conventional product fusion method in overcoming an under merged failure mode.
Figure 10B:
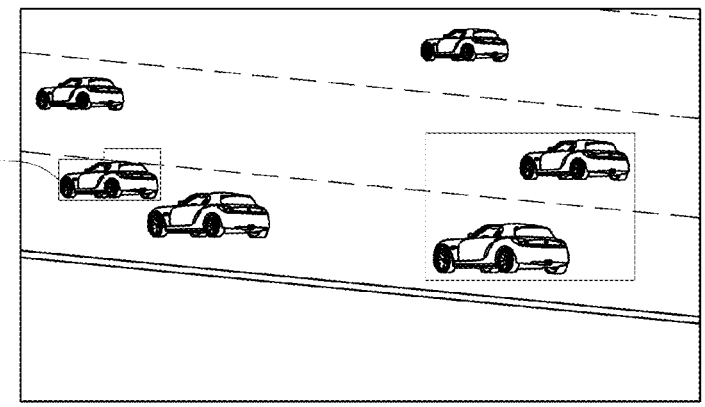
Figure 10C:
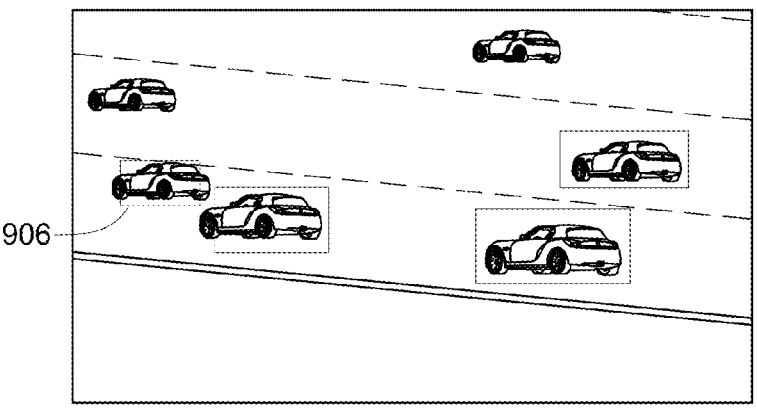

FIGS. 10a-10c illustrate the performance of an exemplary embodiment of the fuzzy technique compared with the conventional product fusion method. The initial set of bounding boxes used for both the methods are shown in FIG. 10a. The moving object detection results by box merging with heuristic distance metric are shown in FIG. 10b. The figure shows that one moving object 902 in the scene has been detected as a multiple bounding boxes 904. The moving object detection results by fuzzy box merging distance metric are shown in FIG. 10c. The moving object 902 that was detected as a plurality of bounding boxes in FIG.

10b is detected as a single bounding box 906. The value of "τ" used in both the algorithm is 0.3. The results show the superior performance of the fuzzy method in overcoming the under merged failure mode.

Results of FIGS. 9a-9c and FIGS. 10a-10c indicate that heuristic distance metric by product fusion is not a good metric to differentiate the boxes that belongs to the same moving object and that belongs to the different moving objects. Reliable moving bounding box detection cannot be achieved using the heuristic distance metric irrespective of the tuning of distance threshold τ. Results further confirms that fuzzy logic based distance metric merges all bounding boxes that belong to the same moving object correctly into a vehicle bounding box. The box merging method based on fuzzy logic formulation integrates human heuristics which cannot be defined with explicit mathematical model in a meaningful way.

In accordance with the embodiments discussed herein, the fuzzy based agglomerative clustering algorithm identifies appropriate boxes for merging in a noisy environment. The uncertainty in the data is accurately modeled by the proposed embodiments. The bounding boxes produced by detection of frame differences can be very noisy. Hence it is not an easy task to determine machine learning strategies to automatically learn the optimal box merging criteria. The process of merging boxes, in an optimal way, is complicated due to the uncertainty inherent in the data techniques. The embodiments of the present technique accurately models the uncertainties associated with the data and with the decision rule. Fuzzy logic based bounding box merging technique enhances moving object detection performance It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A method implemented using a processor based device, comprising:
   receiving a video stream comprising a plurality of image frames having at least one moving object;
   determining a difference between at least two image frames among the plurality of image frames and generating a difference image comprising a plurality of image blobs corresponding to the at least one moving object;
   generating a plurality of bounding boxes, each bounding box surrounding at least one corresponding image blob among the plurality of image blobs;
   determining a subset of bounding boxes among the plurality of bounding boxes, associated with the corresponding moving object, using a fuzzy decision variable determined based on a motion cohesion fuzzy parameter, an appearance similarity fuzzy parameter, and a box affinity fuzzy parameter corresponding to each pair of bounding boxes among the subset of bounding boxes; and
   merging the subset of bounding boxes to generate a merged bounding box enclosing the subset of bounding boxes to detect the moving object.

2. The method of claim 1, wherein the box affinity fuzzy parameter for a pair of bounding boxes is based on a geometrical affinity of the pair of bounding boxes.

3. The method of claim 1, wherein the motion cohesion fuzzy parameter for a pair of bounding boxes is based on a motion cohesion between the pair of bounding boxes.

4. The method of claim 1, wherein the appearance similarity fuzzy parameter for a pair of bounding boxes is based on an appearance similarity between the pair of bounding boxes.

5. The method of claim 1, wherein each of the motion cohesion fuzzy parameter, the appearance similarity fuzzy parameter, the box affinity fuzzy parameter, and merge fuzzy parameter comprises a corresponding linguistic variable determined based on a corresponding characterizing parameter and a corresponding membership function.

6. The method of claim 5, wherein the corresponding membership function comprises a Gaussian function, or a sigmoid function.

7. The method of claim 1, wherein merging the subset of bounding boxes is based on an agglomerative clustering algorithm.

8. The method of claim 7, wherein merging the subset of bounding boxes comprises merging a pair of bounding boxes to generate the merged bounding box enclosing the pair of bounding boxes.

9. The method of claim 8, further comprising determining an area of the merged bounding box, wherein merging the pair of bounding boxes is based on the determined area of the merged bounding box.

10. A system comprising:
    a processor based device configured to:
      receive from a video camera a video stream comprising a plurality of image frames having at least one moving object;
      determine a difference between at least two image frames among the plurality of image frames to generate a difference image comprising a plurality of image blobs;
      generate a plurality of bounding boxes, each bounding box surrounding at least one corresponding image blob among the plurality of image blobs;
      determine a subset of bounding boxes among the plurality of bounding boxes, associated with the corresponding moving object, using a fuzzy decision variable determined based on a motion cohesion fuzzy parameter, an appearance similarity fuzzy parameter and a box affinity fuzzy parameter corresponding to each pair of bounding boxes among the subset of bounding boxes; and
      merge the subset of bounding boxes to generate a merged bounding box enclosing the subset of bounding boxes to detect the moving object.

11. The system of claim 10, wherein the processor based device is further configured to determine at least one of a geometric affinity, a motion cohesion and an appearance similarity corresponding to a pair of bounding boxes.

12. The system of claim 10, wherein the processor based device is further configured to determine the fuzzy parameter comprising a linguistic variable determined based on a characterizing parameter and a membership function for each of the motion cohesion fuzzy parameter, the appearance similarity fuzzy parameter, the box affinity fuzzy parameter, and merge fuzzy parameter.

13. The system of claim 10, wherein the processor based device is configured to merge a pair of bounding boxes among the subset of bounding boxes to generate a merged bounding box enclosing the pair of bounding boxes.

14. The system of claim 13, wherein the processor based device is configured to determine an area of the merged bounding box, wherein the pair of bounding boxes is merged based on the determined area of the merged bounding box.

15. A non-transitory computer readable medium encoded with a program to instruct a processor based device to:
  receive a video stream comprising a plurality of image frames having at least one moving object;
  determine a difference between at least two image frames among the plurality of image frames to generate a difference image comprising a plurality of image blobs corresponding to the at least one moving object;
  generate a plurality of bounding boxes, each bounding box surrounding at least one corresponding image blob among the plurality of image blobs;
  determine a subset of bounding boxes among the plurality of bounding boxes, associated with the corresponding moving object, using a fuzzy decision variable determined based on a motion cohesion fuzzy parameter, an appearance similarity fuzzy parameter and a box affinity fuzzy parameter corresponding to each pair of bounding boxes among the subset of bounding boxes; and
  merge the subset of bounding boxes to generate a merged bounding box enclosing the subset of bounding boxes to detect the moving object.

* * * * *